Dec. 10, 1946.    J. A. OBERMAIER    2,412,418
SECURING AND SEALING MEANS FOR METER BOX HOUSINGS
Filed Jan. 6, 1944    2 Sheets-Sheet 1
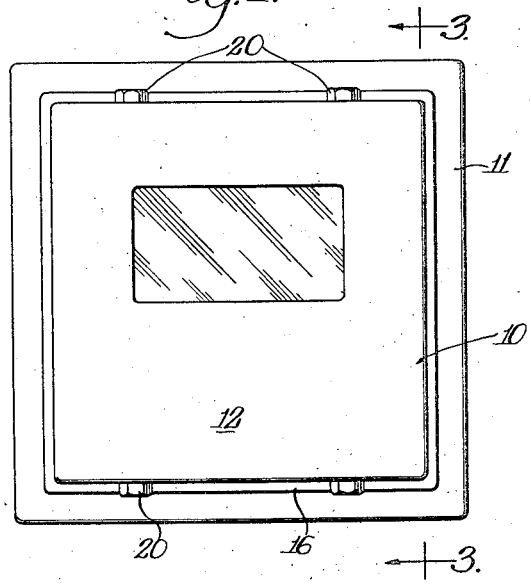
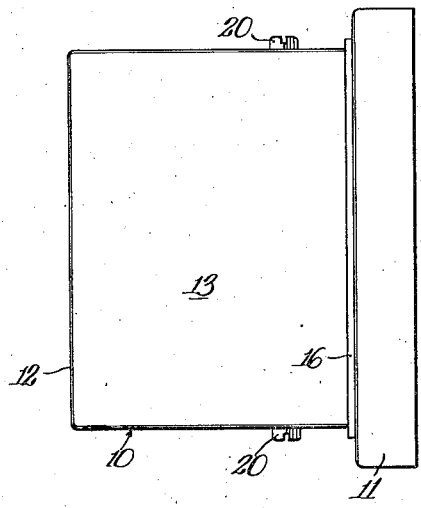
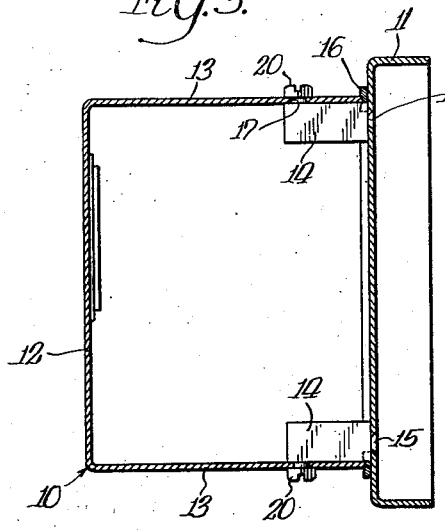
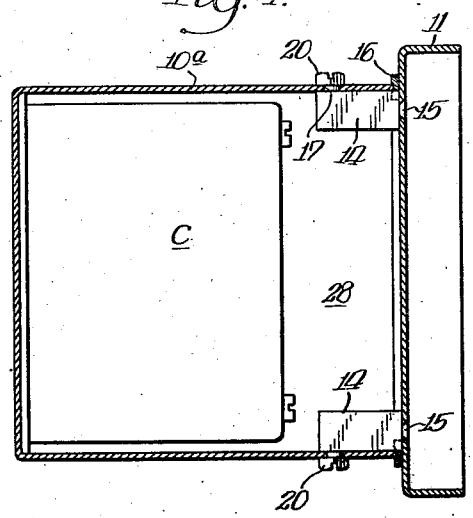
INVENTOR.
John A. Obermaier,

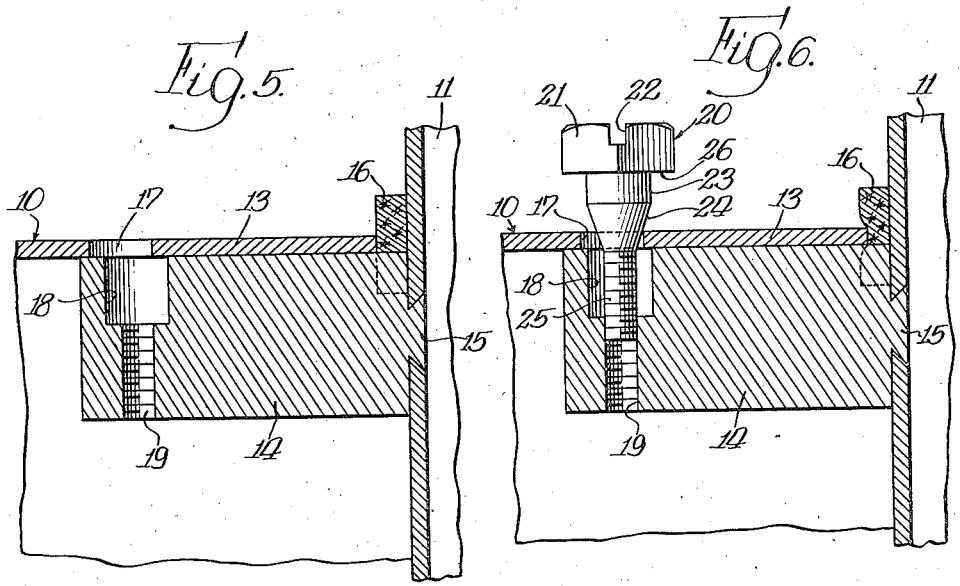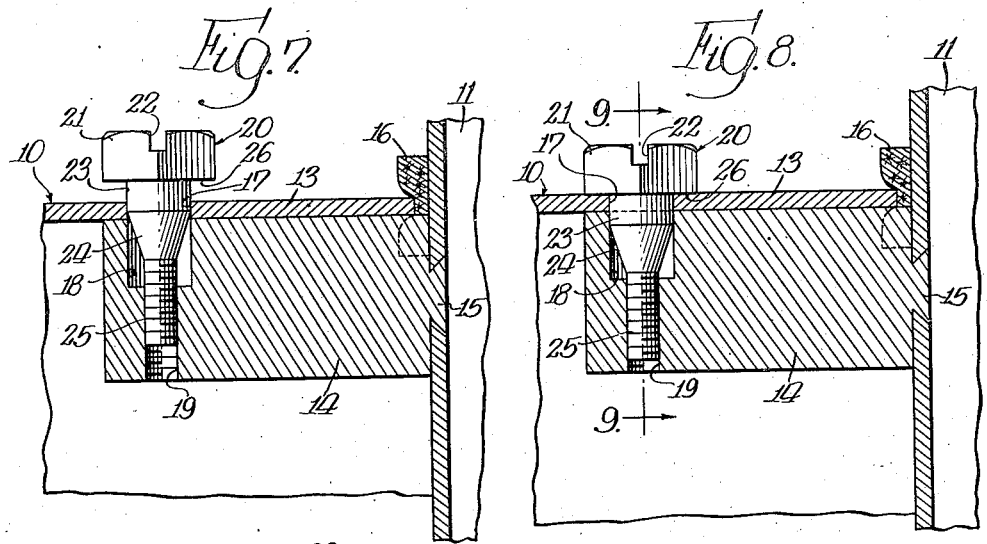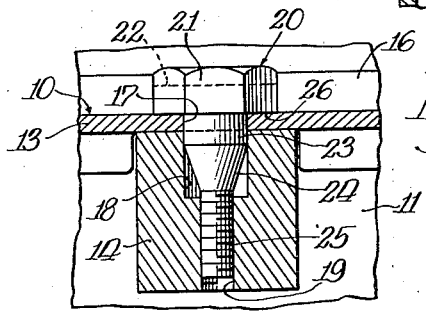

Patented Dec. 10, 1946

2,412,418

UNITED STATES PATENT OFFICE 2,412,418

SECURING AND SEALING MEANS FOR METER BOX HOUSINGS

John A. Obermaier, River Forest, Ill.

Application January 6, 1944, Serial No. 517,256

1 Claim. (Cl. 220—18)

This invention relates to securing and sealing means and has to do with means for securing a structure on a base and for effecting a substantially fluid tight seal between the structure and the base.

It is frequently desirable to provide a fluid tight seal between a base member and a structure mounted thereon such as, for example, a meter housing mounted on a base. It is known to mount meter housings and analogous structures on bases by means of posts secured to a base member and receiving securing screws which pass through the outer or front wall of the housing, there being a sealing gasket interposed between the housing and the base member. In such a structure, the posts extend to within a short distance of the outer or front wall of the housing and occupy considerable space therein, rendering it necessary to have the housing of materially greater size than would be required if the posts extended a short distance only into the housing, leaving the interior thereof substantially unobstructed to accommodate the meter or other associated mechanism. In the structure referred to, when the securing screws are turned into the posts, the housing is forced toward the base member for compressing the sealing gasket and effecting a fluid tight seal between the housing and the base member. That is objectionable, however, for the reason noted, as requiring a housing of materially larger size than the enclosed meter or mechanism, and is also objectionable in that the securing screws are at the front of the housing and detract from the appearance thereof, which is objected to by many users of meters of various kinds. It is also known to mount a housing upon a base member by means of comparatively short posts secured to the base member and receiving securing screws passing through the side walls of the housing. The housing seats on the sealing gasket seating on the base member, and is pressed toward the base member for compressing the gasket and for positioning the openings in the housing walls in alignment with the openings in the posts, for insertion of the securing screws. In this construction the only pressure to which the sealing gasket is subjected is that applied to the housing when securing the latter in position, and the necessity of forcing the housing toward the base member, by pressure exerted on the outer end of the housing, is objectionable in that it frequently renders application of the housing to the base member difficult.

My invention is directed to securing and sealing means whereby a meter housing or other structure may be secured upon a base member with expedition and facility so as to assure a fluid tight seal between said members, while avoiding the above referred to objections to the known structures briefly described above. More specifically, I provide a base member and means for securing thereon a housing or wall structure with a sealing gasket interposed between the housing or wall structure and the base member, the securing means comprising means for forcing the housing or wall structure toward the base member and thereby compressing the sealing gasket. The securing means, in the more specific embodiment thereof, comprises relatively short anchorage means, in the form of posts, riveted or otherwise suitably secured to the base member, the housing or wall structure fitting over the posts and being provided with appropriately disposed openings cooperating with securing screws passing therethrough and screwing into the posts, these openings and openings in the posts cooperating with the screws in a novel manner to force the housing or wall structure toward the base member, thereby compressing a sealing gasket between the base member and the wall structure or the housing, thereafter locking the wall structure or housing to the posts. Further objects and advantages of my invention will appear from the detailed description.

In the drawings:

Figure 1 is a front view of a base member and a housing mounted thereon by the securing and sealing means of my invention;

Figure 2 is a side view of the housing and base member and associated securing and sealing means of Figure 1;

Figure 3 is a sectional view taken substantially on line 3—3 of Figure 1;

Figure 4 is a sectional view on the order of Figure 3 but showing a modified form of housing structure mounted upon a base member in accordance with my invention;

Figure 5 is a detail fragmentary sectional view, on an enlarged scale, of a housing and a base member and associated securing and sealing means embodying my invention, showing the positions of the parts preliminary to securing the housing;

Figure 6 is a view similar to Figure 5 but showing the securing screw as having been screwed a short distance into the associated post with corresponding movement of the housing wall toward the base member;

Figure 7 is a view similar to Figure 6 but showing the position of the housing wall after the securing screw has been screwed into the post to a considerably greater extent than in Figure 6;

Figure 8 is a view similar to Figure 7 but with the securing screw completely screwed into the post; and Figure 9 is a section view taken substantially on line 9—9 of Figure 8, certain parts being shown in elevation.

I have illustrated my invention, by way of example, as applied to a housing 10, which may be a meter housing, mounted on a base member 11 of channel section both lengthwise and transversely, the base member in this instance being square. The housing 10 is shown as cubiform, being square in cross section and comprising an outer or front wall 12 and side walls 13 extending rearward from the front wall. Suitably disposed anchorage members, in the form of posts 14, conveniently square in cross section, are riveted or otherwise suitably secured at 15 to base member 11 and project forwardly therefrom. The housing 10 fits over the posts 14, with two of its side walls in contact with the flat outer faces of the posts, there being a sealing gasket 16 interposed between the inner edges of the walls of the housing and the front face of the member 11. This sealing gasket is shown, in Figures 5 to 8, inclusive, as being formed of a cork composition, though it will be understood that the sealing gasket may be of any other suitable material.

The side walls 13 of housing 10 which contact the posts 14 are provided with cylindrical openings 17 therethrough disposed to be out of register, outwardly away from the base member 11, with bores 18 in posts 14, opening through the outer sides thereof, when the housing is seated on gasket 16 with the latter substantially uncompressed, as in Figure 5. Referring to the latter figure, the bore 18 in post 14 is of the same diameter as opening 17 in wall 13, and the gasket 16 may be notched out to fit about the post 14, as indicated. Post 14 is further provided with a reduced threaded bore 19 coaxial with and extending from the inner end of bore 18.

After the housing has been positioned on the gasket 16 in the manner stated and as shown in Figure 5, it is secured to the respective posts 14 by means of securing screws 20. Each of the screws 20 comprises a head 21, preferably hexagonal in shape, provided with a transverse slot 22, a cylindrical element 23 extending from head 21, a frusto-conical element 24 extending from element 23 and tapering inwardly of the screw, that is, away from element 23, and a reduced threaded element 25, constituting a screw stud, extending from the smaller or inner base of element 24. Head 21 projects radially outward beyond element 23 providing, at its inner face, a flat surface 26 of appreciable width. The cylindrical element 23 is of the same diameter as opening 17 of wall 13 and bore 18 of post 14, and element 25 is adapted to screw into bore 19 of post 14. The length of element 25 of the screw is such that this element may be turned a short distance in the bore 19 before the frusto-conical element 24 is brought into pressure contact with the inner side of opening 17 of wall 13. Thereafter, as the screw 20 is screwed into post 14, the element 24 thereof exerts a camming action upon the wall 13, at the inner side of opening 17, forcing this wall toward the base member 11 and compressing the gasket 16, as shown in Figure 6. In the continued screwing of the screw 20 in the post 14, wall 13 is forced toward base member 11, further compressing the gasket 16, until cylindrical element 23 of the screw enters opening 17 of wall 13, which opening 17 is then in register with bore 18 of post 14, as shown in Figure 7. Thereafter screw 20 is screwed fully into post 14, with cylindrical element 23 thereof extending through opening 17 of wall 13 and into bore 18 of post 14. That effectively locks wall 13 to post 14 and positively prevents movement of the housing either toward or away from the base member 11. In that manner, the gasket 16 is compressed to the proper extent between the housing and the base member to effect a fluid tight closure therebetween, compression of the gasket to such an extent as to cause injury thereto being prevented and, thereafter, pressure exerted upon the outer or front face of the housing is not transmitted to the gasket, being taken by the securing screws and the posts. That assures that further compression of the gasket, due to the housing being subjected to pressure toward the base member, by being struck or from other causes, will not occur. The advantage of that is that if the gasket were subjected to further compression, and that were repeated a number of times, the area of the gasket between the walls of the housing and the base member might become compressed to such an extent that in the normal position of the housing on the base member the seal between the latter member and the housing may not be effectively maintained as a fluid tight seal. When the screw 20 is turned fully into the post 14, the flat inner face 26 of screw head 21 bears tightly against the outer face of wall 13, which is clamped between the head of the screw and the outer face of post 14, thereby providing a fluid tight seal about the securing screw. If desired, a suitable sealing gasket may be disposed about element 23 of the screw, though ordinarily that is not necessary. In Figures 5 to 8, inclusive, the thickness of the sealing gasket and the amount of compression thereof has been exaggerated for purposes of illustration, as will be understood.

In certain cases it is desirable to provide within the meter housing adequate space for connections, such as electrical connections, disposed within the housing. In the modified form of my invention shown in Figure 4, the housing 10a is of greater depth than the housing shown in Figures 1 to 3, inclusive, and has mounted therein, in a known manner, a meter casing C, spaced away from base member 11 a sufficient distance to provide, between the front face of member 11 and the rear face of casing C, a space 28 adequate to accommodate the desired connections. As will be noted from Figures 3 and 4, the posts 14 may be quite short, relative to the interior of housing 10 or 10a, providing within the latter and outward beyond the posts 14 adequate space for a meter or other mechanism to be mounted within the housing.

While I have shown a housing of rectangular or square cross section, as illustrating one form of structure to which my invention is applicable, it will be understood that the housing may be of any suitable shape, such as cylindrical for example, other than square. Also, within the broader aspects of my invention, the wall 13 of Figures 5 to 8, inclusive, may be a wall of a housing or a wall of any other structure between which and the base member 11 it is desired to effect a fluid tight seal. The base member 11 also may be of any suitable shape and construction and may be mounted in any suitable known manner on an associated supporting structure.

As above indicated, and as will be understood by those skilled in this art, changes in construction and arrangement of parts of my invention may be resorted to without departing from the field and scope thereof, and I intend to include all such variations, as fall within the scope of the appended claim, in this application in which the preferred form only of my invention has been disclosed.

I claim:

In a device of the class described, in combination, a base member, a post secured to and extending from said base member, said post having a laterally directed threaded opening therein, a housing having a wall extending externally over said post and toward said base member, a compressible sealing gasket between said base member and the inner edge of the wall of said housing, said wall having an opening out of complete axial alignment with the threaded opening in said post with the axis of the last named opening offset toward the base when said gasket is uncompressed and a screw having a shank adapted to be inserted through the opening in the wall of the housing and threaded at its inner end to be screwed into the threaded opening in said post, the shank of said screw having an enlarged tapered portion cooperable with the wall of the housing along the edge of the opening therein to force the inner edge of the wall of the housing toward the base member and compress the gasket therebetween upon screwing said screw into said post.

JOHN A. OBERMAIER.